Sept. 6, 1955          J. W. GOODYEAR          2,716,861
PRESSURE ENERGY TRANSLATING AND LIKE DEVICES
Filed May 17, 1949          6 Sheets-Sheet 1
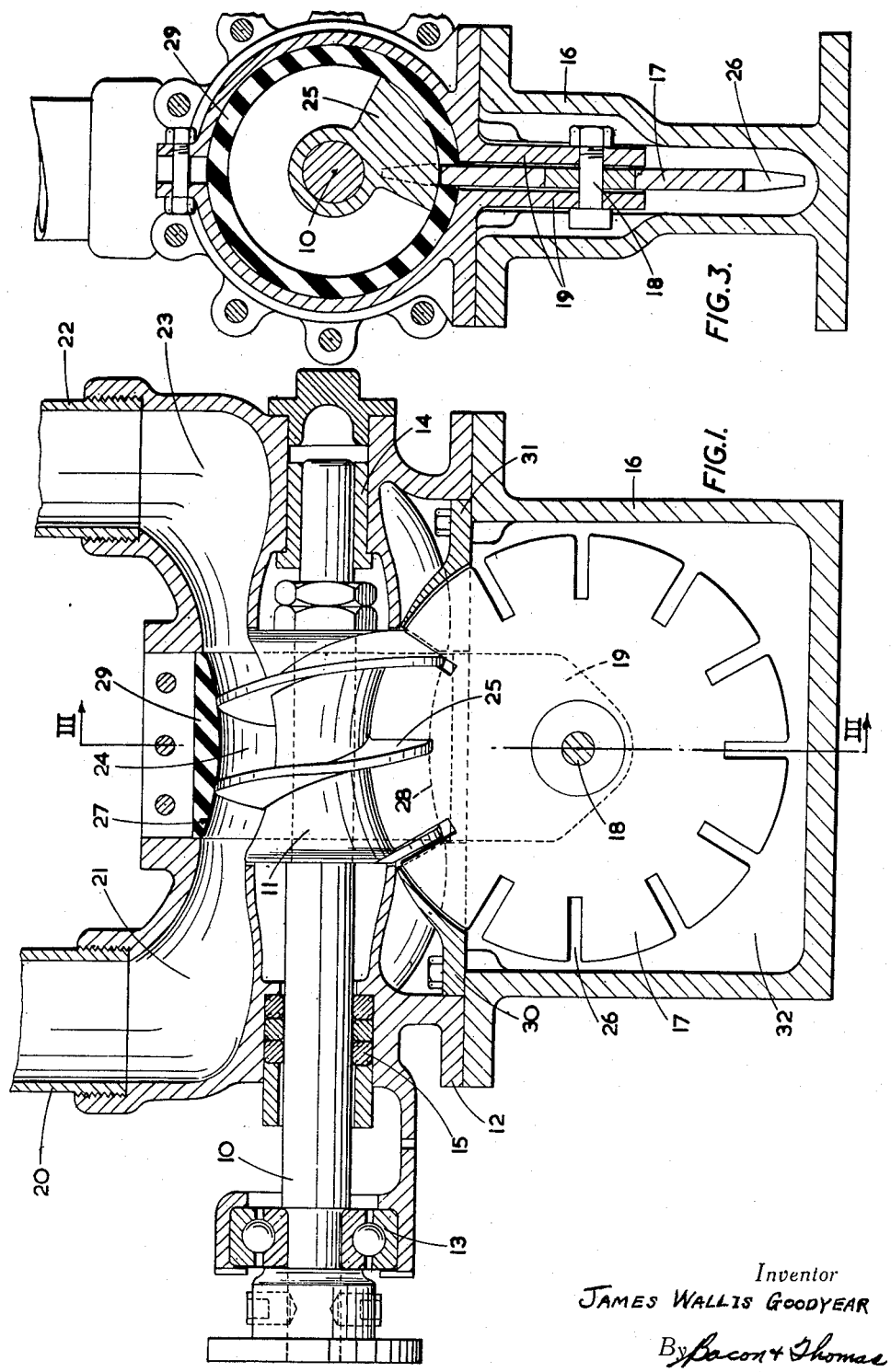
*Inventor*
JAMES WALLIS GOODYEAR
By Bacon & Thomas
*Attorneys*

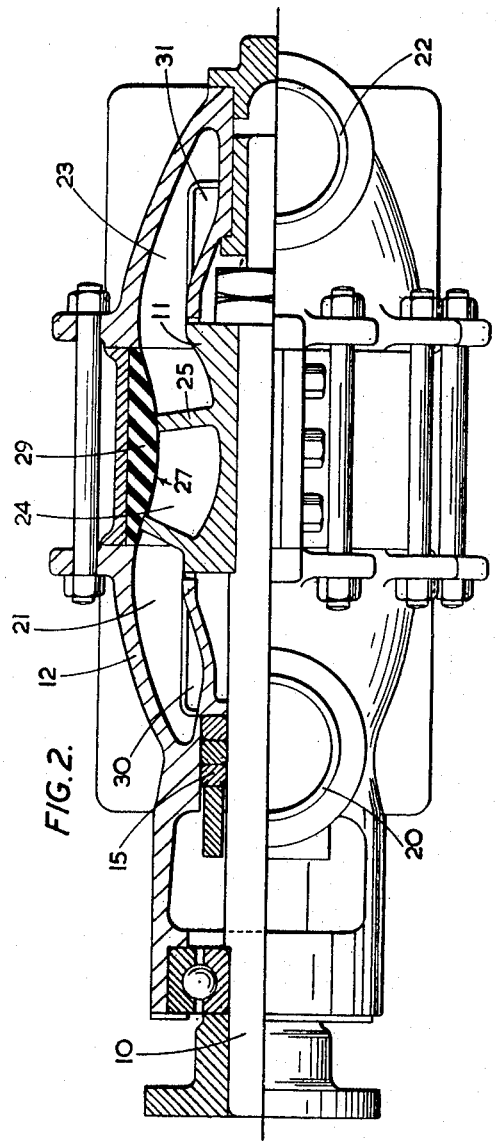

Sept. 6, 1955 J. W. GOODYEAR 2,716,861
PRESSURE ENERGY TRANSLATING AND LIKE DEVICES
Filed May 17, 1949 6 Sheets-Sheet 3
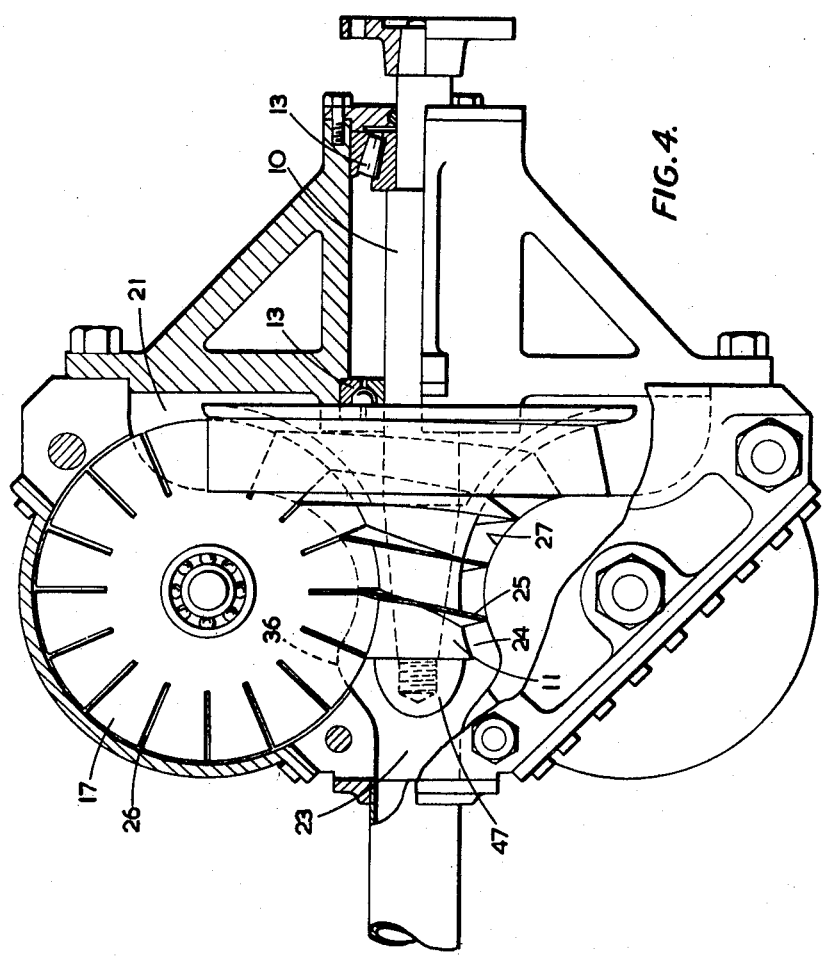
Inventor
JAMES WALLIS GOODYEAR
By Bacon + Thomas
Attorneys

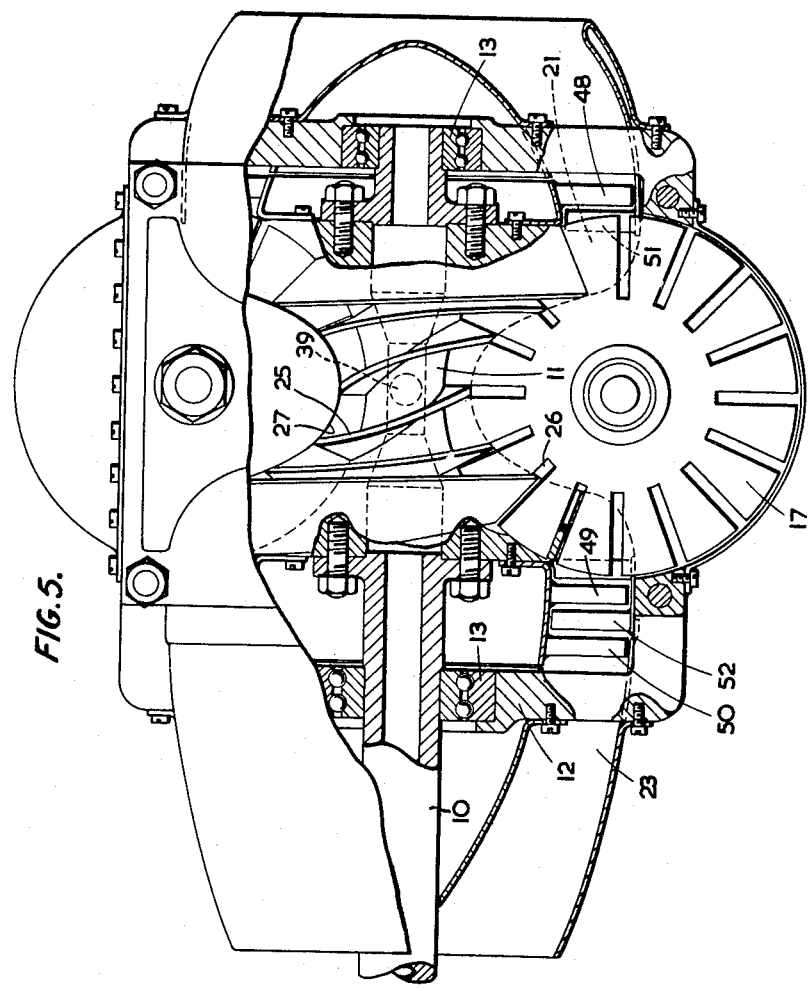

Sept. 6, 1955   J. W. GOODYEAR   2,716,861
PRESSURE ENERGY TRANSLATING AND LIKE DEVICES
Filed May 17, 1949   6 Sheets-Sheet 5
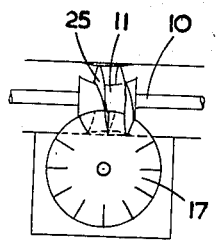
FIG.6.
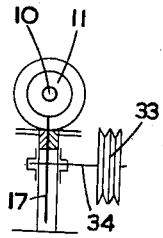
FIG.7.
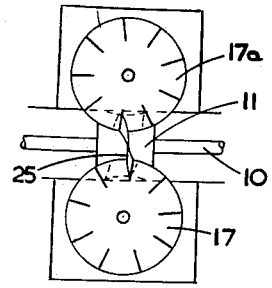
FIG.8.
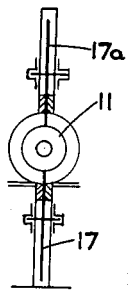
FIG.9.
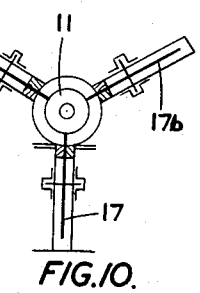
FIG.10.
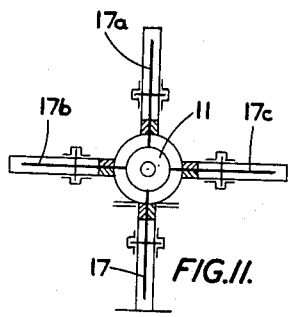
FIG.11.
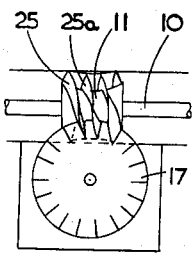
FIG.12.
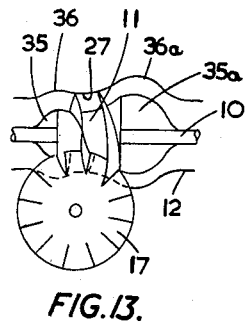
FIG.13.
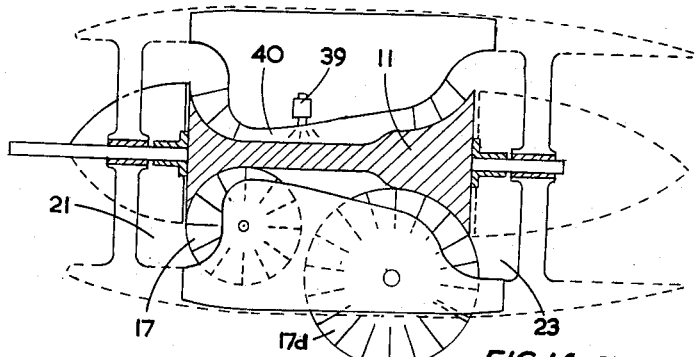
FIG.14.   *Inventor*
JAMES WALLIS GOODYEAR
By Bacon + Thomas
*Attorneys*

Sept. 6, 1955  J. W. GOODYEAR  2,716,861
PRESSURE ENERGY TRANSLATING AND LIKE DEVICES
Filed May 17, 1949  6 Sheets-Sheet 6
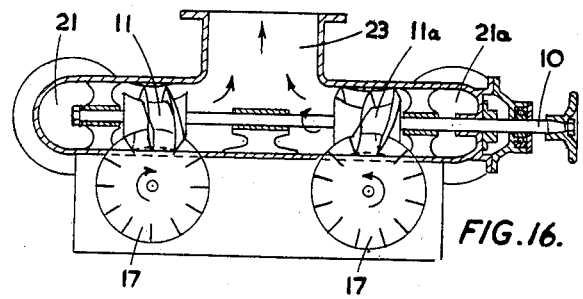
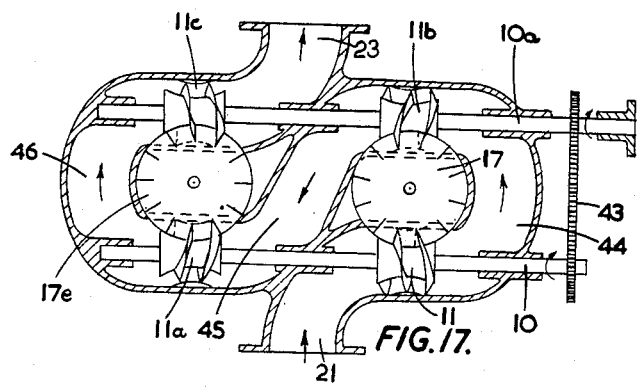
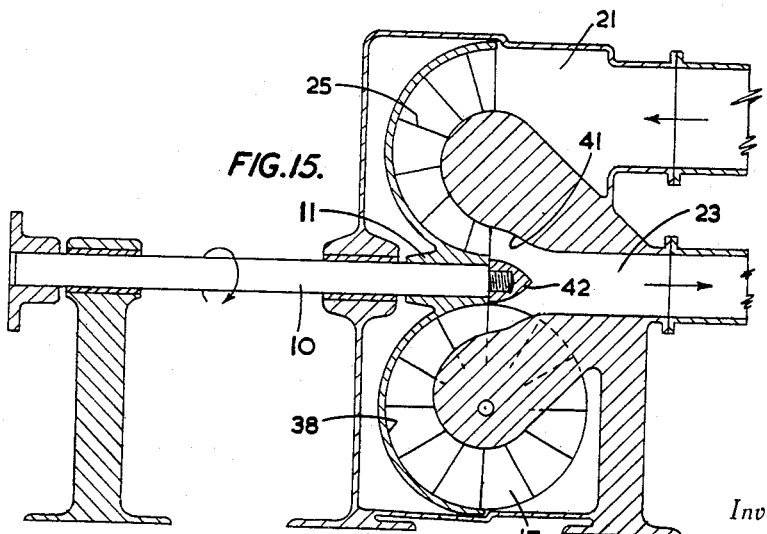
Inventor
JAMES WALLIS GOODYEAR
By Bacon + Thomas
Attorneys

2,716,861

PRESSURE ENERGY TRANSLATING AND LIKE DEVICES

James Wallis Goodyear, Polpenwith, Constantine, Falmouth, England

Application May 17, 1949, Serial No. 93,804

Claims priority, application Great Britain May 19, 1948

19 Claims. (Cl. 60—13)

The present invention relates to pressure energy translating and like devices and may be applied for example to pumps, compressors, blowers and exhausters and to rotary engines and hydraulic motors. The term "pressure energy translating devices" is intended to include devices operating either under positive pressure or under negative pressure, i. e. under vacuum.

The present invention consists in a rotor rotatable within or relatively to a casing or co-operating shroud and having an outstanding worm or convolute vane, the convolutions of which extend around the axis of the rotor with a gradually varying inclination relatively to said axis of rotation and mesh with slots or notches equidistantly spaced around the edge of a rotatable wheel or disc so that portions of said disc between said slots extend into the spaces formed between the convolutions of said vane to form partitions in said spaces.

A further feature of the invention consists in a rotor rotatable within or relatively to a casing or cooperating shroud and having convolutions of gradually varying inclination meshing with a rotatable wheel or disc as described above and in which the rotor body is of longitudinal curvature corresponding to the peripheral curvature of the disc to enable the periphery of the disc to run closely adjacent thereto and in which the shape of the casing or shroud conforms closely with the envelope of the vane and is of axially curved non-cylindrical form so as to provide between itself and the rotor body either a working space for said vane of substantially constant cross-sectional area appropriate to constant volume of flow or a working space for said vane of gradually varying cross-section appropriate to compression or expansion of a fluid or to compression followed by expansion.

Thus, in one application of the invention the working space for the vane is of longitudinally constant cross-sectional area in spite of the curved longitudinal shape of the rotor body. This is applicable, for example, to devices for dealing with substantially incompressible liquids such as water, oils or molasses for example or even with solid or semi-solid materials such for example as massecuites or cement grout.

Thus, in another application of the invention the working space for the vane is either of continuously increasing or decreasing cross-sectional area from one end to the other or is first of decreasing cross-sectional area proceeding from one end and then of increasing cross-sectional area towards the other end. In this application of the invention a portion of the length of the working space may, if desired, be of constant cross-section. Such applications are suitable, by way of example, for devices for use with compressible fluids such for example as compressors, blowers, rotary engines and the like.

In the application of the invention to pumps and motors for use with liquids, an important feature of the invention, applicable when the nature of the liquid permits, consists in forming certain of the co-operating parts of or lining them with rubber, synthetic rubber or a like resilient material to co-operate with other parts formed of relatively non-resilient material. Thus, for example, the shroud and/or the disc may be formed of or lined with rubber to co-operate with a worm formed of relatively non-resilient material such as metal. Alternatively the complete rotor or the vane thereof may be formed of or lined with rubber or similar material to co-operate with a shroud and a disc formed of a suitable metal. In the case of the said disc it may be sufficient to line the peripheral edges thereof which mate with the rotor i. e. to line the arcuate peripheral portions and the edges of the slots with rubber or like material.

The said resilient material should be chosen with reference to the nature of the liquid with which the pump or motor is to be used so that the liquid will not attack the material chosen but rather will act as a lubricant between the parts made of or lined with such material and those formed of non-resilient material.

The said vane is preferably formed as a wall element of substantial depth and of shape complementary to the shape of the slots in the disc so that the slots in the disc may be successively substantially completely filled by the cross section of the vane.

The rotor body, or at least that part of it which co-operates with said notched disc, will as a rule be of gradually varying diameter to correspond with the peripheral shape of the disc so that the cross-sectional profile of the rotor taken in a plane containing the disc will be an arc of a circle of radius approximately equal to the radius of the disc. If the axis of rotation of the disc is perpendicular to the axis of rotation of the rotor then the profile of the rotor, taken in a plane containing its axis of rotation, should be an arc of a circle.

Since the vane is of substantial depth the inclination of the vane relatively to the axis of rotation of the rotor must change gradually to enable the vane to mesh smoothly with the slots in the disc. For example in the case of a symmetrical bobbin-like rotor of a smaller diameter at its mid length and increasing in diameter equally towards both ends the vane and its mid length will, if the slots in the disc are directed radially, project perpendicularly outwardly from the rotor body and will gradually incline increasingly towards a plane passing perpendicularly through the axis of the rotor at the mid length thereof.

The slots in the disc may extend radially inwardly from the edge of the disc or alternatively they may be inclined at an angle to the radial direction provided that the inclination of the vane is correspondingly arranged.

The vane must be of constant pitch measured along the surface of the rotor body in any plane containing the axis of the rotor or in other words, along any arc of a circle in the plane of the disc having its centre on the axis of rotation of the disc. Thus the variation in the inclination of the vane relatively to the axis of rotation of the rotor will depend upon the diameter of the disc and upon the direction of its axis of rotation in relation to the axis of rotation of the rotor. It will in most instances be convenient to mount the disc for rotation about an axis perpendicular to the axis of rotation of the rotor in which event the vane at any point will lie at a constant angle to and preferably perpendicular to the tangent to the rotor surface taken in a plane passing through the axis of rotation of the rotor and passing through the intersection of the vane with the rotor body at that point.

One form of rotor body according to the present invention, may be of bobbin-like form of increasing diameter towards its ends. A second form of rotor body may be of bobbin-like form of increasing diameter from one end to the other, whilst a third form of rotor body may consist of an annulus having an annular trough of part circular cross section with a volute or spiro-helical vane running around the surface of the trough from the inner edge of the trough to the periphery.

Although it is preferable that the rotor be of curved longitudinal or axial profile, a short rotor may be of straight sided or cylindrical form provided however that the inclination of the vane is suitably gradually varied along the rotor to enable the vane to mesh smoothly with the notched disc. In this latter arrangement, the portions of the disc between the notches will not completely fill the spaces between the convolutions of the vane but will nevertheless fill said spaces sufficiently to afford a reasonably good result provided that the disc is not of unduly small diameter having regard to the depth of the vane and the length of the rotor.

A casing enclosing the disc and in or within which it is journalled may be secured to the rotor casing on opposite sides of an axial slot formed in the rotor casing.

The rotor may have one or more vanes or worms formed thereon and the minimum number of convolutions of each vane necessary for successful operation is dependent upon the number of vanes formed on the rotor. Again the rotor may co-operate with one or more slotted discs. If two or more slotted discs are employed then they are preferably disposed at equal angles around the rotor. It will follow that the number of convolutions of the vane or vanes necessary for successful operation will also be dependent upon the number of discs employed.

For the purpose of determining the minimum number of convolutions necessary for a rotor having a given number of vanes and co-operating with a given number of discs, the following expression may be used:

$$\text{Convolutions} = \frac{\text{number of vanes plus number of discs}}{\text{number of vanes multiplied by number of discs}}$$

It will be appreciated that the rule given above as to the minimum number of convolutions required is theoretical and in practice it will be advisable for the convolutions to be slightly longer than indicated by the rule.

The invention thus includes devices as described above embodying a rotor having one or more vanes thereon and co-operating with one or more notched or slotted discs and in which the length of the convolutions of the vane or vanes is not less than and is preferably slightly greater than the number of vanes plus the number of discs divided by the product of the number of vanes and the number of discs.

The invention is of particular importance in connection with the pumping of viscous liquids, such as oils and molasses or of liquids containing solids such for example, as massecuites in the sugar industry or magma in the plastics industry. The invention may of course be used for the pumping of water, oils and other liquids.

The invention may also be applied to prime movers such, for example as hydraulic motors, rotary internal combustion engines and gas turbines. In the application of the invention to a rotary internal combustion engine, air for combustion may first of all be compressed and the products of combustion later expanded in one and the same working space and by one and the same rotor, the cross-sectional area between the rotor and the casing first of all gradually decreasing and then after the combustion zone gradually increasing. The combustion zone may if desired be of uniform cross section. Such an internal combustion motor may have a bobbin-like rotor of increasing diameter from its mid length towards its ends and co-operating with between one third and one half of the circumference of the notched or slotted disc. Alternatively an elongated rotor may be employed, the centre portion being of relatively small diameter and the ends being of increasing diameter and each end having a separate vane thereon meshing with separate discs. In this case combustion may be arranged to take place in a space between the inner ends of the vanes, the vane at one end being adapted to compress air for combustion and that at the other end to expand the products of combustion.

The invention may be applied to a prime mover operated by steam, expansion of the steam taking place along a working chamber of increasing cross-sectional area.

In the application of the invention to steam or internal combustion motors or to motors operated by compressed air or other gas or gases, the device of the present invention may be combined with one or more sets of turbine blades which may be mounted on the rotor of the present invention at the end of or spaced from the end of a vane working in a working space of increasing cross-sectional area.

The invention will be further described with reference to the accompanying drawings in which:

Fig. 1 is a side elevation partly in section of an embodiment of the invention having a rotor and single rotatable wheel or disc, Fig. 2 is a plan view partly in section of the embodiment shown in Fig. 1, Fig. 3 is an end elevation in section along the line III—III in Fig. 1, Fig. 4 is a part sectional side elevation of an embodiment having a varying cross-sectional path area, Fig. 5 is a side elevation partly in section of an internal combustion turbine embodying the present invention, Fig. 6 is a diagrammatic representation of the basic form of the present invention, Fig. 7 is a diagrammatic end elevation partly in section of the embodiment shown in Fig. 6, Fig. 8 is a diagrammatic representation of an embodiment incorporating two rotatable wheels or discs co-operating with a single rotor, Fig. 9 is a diagrammatic end elevation partly in section of the embodiment shown in Fig. 8, Fig. 10 is a diagrammatic representation partly in section of the end elevation of an embodiment including three rotatable wheels or discs, Fig. 11 is a diagrammatic representation partly in section of the end elevation of an embodiment including four rotatable wheels or discs, Fig. 12 is a diagrammatic representation of an embodiment of the invention having a rotor with two vanes or worms formed thereon and co-operating with one rotatable wheel or disc, Fig. 13 is a diagrammatic representation of an embodiment having a substantially constant cross-sectional area of path around the rotor, Fig. 14 is a diagrammatic representation partly in section of an embodiment of the invention such as an internal combustion turbine in which a rotor co-operates with two separate rotatable wheels so as to provide varying cross-sectional area of path along the axis of the rotor, Fig. 15 is a diagrammatic representation in section of an embodiment in which the rotor is of annular form, Fig. 16 is a diagrammatic representation in section of an embodiment incorporating two rotors back-to-back and, Fig. 17 is a diagrammatic representation in section of a multi-stage unit incorporating the present invention.

In the embodiment shown in Figs. 1, 2 and 3, shaft 10 carries a rotor 11 and is rotatably mounted in casing 12 by means of bearings 13, 14 and is sealed by means of packing gland 15 where it is extended outside of the casing. In a lower portion of the casing 16 is contained a rotatable wheel or disc 17 which is rotatable about a bolt 18 interconnecting lugs 19 dependent from the casing 12. Inlet conduit 20 connects with an inlet chamber 21 and outlet conduit 22 is connected to outlet chamber 23. Chamber 24 in which is rotated the rotor interconnects chambers 21 and 23. The rotor is generally bobbin-like in form and has a concave outer surface so as to conform in general to the outer circumference of the rotatable wheel or disc 17. Convolutions of a worm or vane 25 of gradually varying inclination extend around the axis of rotation of the rotor 11 and mesh with slots 26 formed equidistantly spaced around and more or less radially in the rotatable wheel or disc 17. The radial depth of the slots is more or less equal to the maximum radial projection of the vanes 25 so that the outer surface of the base of the rotor may run closely adjacent to the outer circumference of the rotatable wheel or disc. Portions of the rotatable wheel or disc between the slots extend into the spaces formed between the convolutions of the worm or vane 25 to form partitions in said spaces.

The inner surface 27 of the casing forming the chamber 24 is not straight longitudinally but is altered to conform with the concave periphery of the rotor in such a manner that a constant cross-sectional area of path obtains from one end of the rotor to the other. The lower part of this internal surface is indicated clearly by the dotted line 28.

In the embodiment shown in Figs. 1 to 3 the rotor is formed of a relatively non-resilient material such as metal whilst the shroud forming the chamber 24 may be lined with a resilient material such as rubber though the actual resilient material will be chosen with reference to the nature of the liquid with which the device is to be used. Preferably the material chosen will be such that the liquid will not attack it but will act as a lubricant. Such a resilient coating is shown diagrammatically in Figs. 1 to 3 at 29.

In the embodiment shown in Figs. 1 to 3 the rotor has one vane and one co-operating rotatable disc is used: Thus applying the expression hereinbefore set forth:

Number of convolutions $$= \frac{\text{number of vanes plus number of discs}}{\text{number of vanes multiplied by number of discs}}$$

$$= \frac{1+1}{1 \times 1} = 2$$

It will be observed that two convolutions of the vane are shown in this embodiment.

In operation, for example, as a pump the shaft 10 will be rotated in an anti-clockwise direction when viewed in Fig. 3 and the liquid will be conveyed from the inlet chamber 21 to the outlet chamber 23. The sealing members 30 and 31 serve more or less to isolate the space 32 inside the lower casing 16 from the inlet and outlet chambers respectively. It will also be appreciated that the apparatus is reversible, that is to say, the shaft 10 may be rotated in a clockwise direction when viewed in Fig. 3 and liquid may be transferred from chamber 23 to chamber 21. Alternatively the apparatus may be used as a motor when liquid under pressure may be introduced into either chamber 21 or 23 whereupon the shaft 10 will be caused to rotate.

In the embodiment shown in Fig. 4 the cross-sectional area of the working space around the rotor is gradually varied from one end of the rotor to the other. The rotor 11 is mounted on shaft 10 which is rotatably mounted in bearings 13. The vane 25 on the rotor 11 engages with the slots 26 formed radially in and equidistantly around the circumference of rotatable wheel or disc 17. The outer surface of the main body of the rotor is concave and conforms in general to the circumference of the rotatable wheel or disc 17. In the embodiment shown it will be seen that the surface of the rotor is in contact with the rotatable wheel or disc for at least one-quarter of the circumference of the latter. The working space for the vane of the rotor is gradually varied from one end to the other being considerably larger in inlet chamber 21 than in outlet chamber 23. The inner surface 27 of the casing forming chamber 24 is shaped to conform with the envelope of the vane on the blade which projects from the surface of the body of the rotor by a continually varying amount. The casing is enlarged at 36 in the region of the smaller diameter end of the rotor, and is so shaped that in conjunction with the nose-piece 47 affixed to the end of shaft 10 an area of substantially constant cross-sectional area of path obtains during the transition from chamber 24 to chamber 23.

The apparatus shown in Fig. 4 may be used as a compressor by applying power to shaft 10 in any suitable manner so as to rotate it in a clockwise direction when viewed from the right-hand end. Fluid will be drawn from the chamber 21 and passed through the chamber 24 into chamber 23. Alternatively the apparatus may be used as an expansion engine in which fluid under pressure would be introduced into chamber 23 and allowed to pass through chamber 24 into chamber 21. In transit the fluid would be expanded and would do work to rotate the rotor 11, power being taken from shaft 10.

Fig. 5 illustrates partly in section an application of the present invention to an internal combustion engine such as a turbine. Rotor 11 generally of bobbin-like form is carried on shaft 10 which is rotatably mounted in the frame 12 by means of bearings 13. The surface of the body of the rotor is concave and generally follows the circumference of the rotatable wheel or disc 17. In this embodiment it will be seen that the surface of the rotor is in contact with the disc for considerably more than one-quarter and nearly one-half its circumference. The vanes 25 outstanding upon the surface of the rotor are of varying height and mesh with the slots 26 on the rotatable wheel or disc 17. The inner surface 27 of the casing is shaped to conform more or less with the envelope of the vane 25. The vane and the inner wall of the casing are so shaped and proportioned mutually that the working space is gradually varied from each end of the rotor to the centre. Thus the cross-sectional area in inlet chamber 21 is considerably larger than that at the region of the centre of the rotor and a fluid in transit from chamber 21 will first of all be compressed towards the central region of the rotor and subsequently expanded into the outlet chamber 23. Fuel injection means 39 as indicated by the dotted circle in the drawing may be provided in the casing at the central region of the rotor.

In operation with the shaft 10 revolving fluid such as air is drawn in through inlet chamber 21 and passed in transit to the central region of the rotor whereat a quantity of fuel such as a hydrocarbon oil is injected. After explosion or combustion the gases travel outward toward the outlet chamber 23 expanding as they go and driving the rotor 11. The mechanical power developed is delivered to the shaft 10. In addition one or more sets of blades may be attached to the rotor, for example, at 48 adjacent the inlet chamber, and 49, 50 adjacent the outlet chamber. These blades co-operate with sets of blades fixed to the casing, the inlet blades 48 co-operating with fixed blades 51 whilst the outlet blades 49 and 50 co-operate with fixed blades 52.

Various embodiments of the present invention are shown diagrammatically in Figs. 6 to 20 by way of example to indicate some of the many applications of this invention.

Fig. 6 illustrates diagrammatically the simplest form of the invention in which a rotor 11 having two convolutions of the vane 25 mounted on shaft 10 co-operates with one rotatable wheel or disc 17.

Fig. 7 illustrates diagrammatically that the drive to or from the apparatus may be made via a suitable pulley 33 on a shaft 34 to which is attached the rotatable wheel or disc 17 as an alternative to connecting the drive to or from the apparatus by means of shaft 10.

Fig. 8 illustrates diagrammatically an embodiment of the invention in which a single rotor 11 co-operates with two rotatable wheels or discs 17, 17a which are disposed diametrically opposite one another. In this embodiment the rotor 11 is illustrated as having one vane 25, having one and a half convolutions since:

Number of convolutions $$= \frac{\text{number of vanes plus number of discs}}{\text{number of vanes multiplied by number of discs}}$$

$$= \frac{1+2}{1 \times 2} = 1\tfrac{1}{2}$$

Fig. 9 is a diagrammatic end view partly in section showing the relative dispositions of the rotor 11 and the rotatable wheels or discs 17, 17a.

Figs. 10 and 11 are diagrammatic end views illustrating partly in section the dispositions of the rotatable wheels or discs relative to the rotor in embodiments incorporating respectively 3 and 4 rotatable wheels 17, 17a, 17b and 17c. It will be seen that the plurality of rotatable wheels or discs are depicted as equally spaced around the rotor but it will be appreciated that whilst this is preferable it is not essential and the invention is in no way limited to such arrangement.

Fig. 12 shows a further embodiment of the invention in which the rotor 11 has two vanes 25, 25a and co-operates with one rotatable wheel or disc 17. It will be seen that each vane has 1½ convolutions and that this number is in agreement with the expression hereinbefore set forth since:

Number of convolutions $$= \frac{\text{number of vanes plus number of discs}}{\text{number of vanes multiplied by number of discs}}$$

$$= \frac{2+1}{2 \times 1} = 1\tfrac{1}{2}$$

Fig. 13 illustrates diagrammatically an apparatus embodying the present invention and suitable for use with substantially incompressible liquids such as water, oils or molasses, for example, or even with solid or semi-solid materials such, for example, as massecuites or cement grout, in which the cross-sectional area of the path through the apparatus is substantially constant. More or less frustroconical elements 35, 35a are disposed around shaft 10 at opposite ends of rotor 11 and co-operate with enlarged sections 36, 36a of the casing 12 so as to provide more or less constant cross-sectional area of path. The inner surface 27 of the casing immediately surrounding the rotor 11 is curved in conformity with the concave surface of the bobbin-like rotor which as hereinbefore described itself conforms with the periphery of the rotatable wheel or disc 17.

Fig. 14 shows a further embodiment of the invention which is suitable for use as an internal combustion engine or turbine and which is more or less similar to that illustrated in Fig. 5. Whereas in Fig. 5 the rotor 11 cooperates with one rotatable wheel or disc 17, in the embodiment shown in Fig. 14 the rotor 11 co-operates with two rotatable wheels 17, 17d of differing diameters. The wheels 17, 17d are mutually co-planar and with the axis of the rotor and are spaced longitudinally of the axis of the rotor. It will be seen that in transit from chamber 21 to chamber 23 fluid is initially compressed into the mid-portion 40, fuel is therein introduced by an injector 39, and the gases allowed to expand slightly prior to a slight compression and subsequent expansion into exhaust chamber 23.

Fig. 15 shows diagrammatically a further embodiment of the invention in which the change of cross-sectional area from chamber 21 to chamber 23 is considerable. In this embodiment the rotor 11 is in the form of an annulus having an annular trough or part circular cross-section with a convolute or spiro-helical vane 25 running around the surface of the trough 38 from the inner edge of the trough to the periphery. The vane on the rotor 11 co-operates with the slots on a rotatable wheel or disc 17. The chamber 23 is enlarged at 41 to co-operate with a conical member 42 secured to the end of shaft 10 which carries rotor 11 whereby the area of cross-section of the path is maintained more or less constant in transition from the inner edge of the trough on the rotor to the chamber 23. This apparatus may be operated either with mechanical power applied to the shaft 10 when it will function as a compressor and fluid from chamber 21 will be delivered to chamber 23, or as an expansion motor when fluid under pressure may be introduced into chamber 23 whence it will expand in transit to chamber 21 whence it will be discharged, power being delivered from shaft 10.

Fig. 16 shows diagrammatically an embodiment of the present invention in which two rotors 11, 11a carry vanes of opposite hand, each co-operating with a rotatable wheel or disc 17. Inlet chambers 21, 21a are joined one to another by means not shown and fluid is drawn therefrom and delivered to outlet chamber 23. In this embodiment substantial equality of pressure is exerted in either direction upon the rotors 11, 11a and axial thrust along the shaft 10 may be more or less eliminated or reduced to a very low value.

Fig. 17 shows diagrammatically an extension of the embodiment shown in Fig. 16 to provide a four-stage unit. Rotors 11, 11b mounted respectively on shafts 10, 10a carry vanes of opposite hand and co-operate with rotatable wheel or disc 17. In a similar manner bobbins 11a and 11c co-operate with rotatable wheel or disc 17e. The shafts 10 and 10a are interconnected by sprocket chain 43 and consequently rotate in the same direction. If, however, they are interconnected by gearing whereby they rotate in opposite directions then it will be necessary to interchange rotors 11b and 11c. Fluid is transferred from chamber 21 through chambers 44, 45 and 46 and delivered into outlet chamber 23.

I claim:

1. In a pressure energy translating device, a rotatable disc having slots equidistantly spaced therearound, a rotor arranged to rotate about an axis approximately at right angles to the axis of rotation of the disc and comprising a rotor body with a convolute vane outstanding therefrom at a gradually varying radial inclination relatively to the axis of the rotor enabling it to mesh with the slots of the disc so that portions of the disc between the slots extend into spaces between the convolutions of the vane to form partitions therein, a casing for said rotor including an inlet chamber and an outlet chamber and an open ended shroud which is located between said chambers and communicates therewith and through which said disc projects to mesh with the rotor, the body of the rotor being of longitudinal curvature corresponding to the peripheral curvature of the disc and running closely adjacent to the periphery of the disc, and the convolute vane being of gradually varying height to cause the vane to extend to a varying extent into the slots of the disc, whilst the shroud is shaped in conformity with the envelope of the vane and is of axially curved non-cylindrical form with its ends substantially coinciding with the ends of said inlet and outlet chambers to permit of smooth and continuous flow of a fluid from the inlet chamber, through the shroud and into the outlet chamber in a direction substantially following the longitudinal contours of the rotor body and shroud.

2. A pressure energy translating device according to claim 1 in which the axial contour of the shroud and of the rotor body are such as to provide therebetween a working space for the vane of substantially constant cross sectional area appropriate to constant volume flow.

3. A pressure energy translating device according to claim 2 embodying two rotors, a shaft carrying said rotors in longitudinally spaced relationship and two notched discs meshing respectively with said rotors.

4. In a pressure energy translating device according to claim 3, rotors carrying vanes of opposite hand, and a casing to provide central outlet chambers intermediate the rotors and inlet chambers on opposite sides of said rotors and means to connect together hydraulically said central outlet chambers to form a duplex single stage device.

5. A pressure energy translating device according to claim 1 in which the axial contour of the shroud and of the rotor body are such as to provide therebetween a working space for the vane of gradually varying cross sectional area appropriate to change of volume of said fluid.

6. A pressure energy translating device according to claim 1 in which the axial contour of the shroud and of the rotor body are such as to provide therebetween a working space for the vane of gradually varying cross sectional area appropriate to compression of a fluid followed by expansion.

7. In a pressure energy translating device according to claim 6, a fuel injection means adapted to deliver fuel to said working space in the region of its minimum cross sectional area.

8. In a pressure energy translating device adapted to operate as an internal combustion turbine according to claim 7, at least one set of turbine or blower blades on at least one end of said rotor and at least one set of cooperating stationary blades on said casing.

9. A pressure energy translating device according to claim 1 in which of the three cooperating members namely the shroud, the rotor and the disc, at least one but not all is formed of a resilient material such as rubber.

10. A pressure energy translating device according to claim 1 in which of the three cooperating members namely the shroud, the rotor and the disc, at least one but not all is coated with a resilient material such as rubber.

11. A pressure energy translating device according to claim 1 in which the rotor body is of bobbin-like form of increasing diameter towards its ends and in conjunction with the shroud provides therebetween a working space for the vane of substantially constant cross sectional area appropriate to constant volume flow.

12. A pressure energy translating device according to claim 1 in which the rotor body is of bobbin-like form of increasing diameter towards at least one end and in conjunction with the shroud provides therebetween a working space for the vane of gradually varying cross sectional area appropriate to a change of volume of said fluid.

13. A pressure energy translating device according to claim 1 in which the rotor body is of bobbin-like form of increasing diameter towards its ends and in conjunction with the shroud provides therebetween a working space for the vane of gradually varying cross sectional area appropriate to compression of a fluid followed by expansion.

14. A pressure energy translating device according to claim 1 in which the rotor body is in the form of an annulus having an annular trough of part circular cross section and the vane is of spiro-helical form and runs around the surface of the trough from the inner edge of the trough to its periphery.

15. A pressure energy translating device according to claim 1 embodying at least two rotatable discs spaced from one another, each having notches equidistantly spaced therearound and meshing with said rotor.

16. In a pressure energy translating device according to claim 1, four rotors, two shafts each carrying two of said rotors in longitudinally spaced relationship and two notched discs arranged between said shafts and each meshing with two of said rotors one on each of said shafts.

17. In a pressure energy translating device according to claim 16, rotors on each shaft carrying vanes of opposite hand and means for connecting the inlet and outlet chamber of the respective rotors in series to provide a four stage pressure energy translating device.

18. In a pressure energy translating device according to claim 1, a shaft carrying said disc, and means to withdraw mechanical power from said disc-carrying shaft.

19. In a pressure energy translating device, a rotatable disc formed of metal having slots equidistantly spaced therearound, a rotor formed of metal arranged to rotate about an axis approximately at right angles to the axis of rotation of the disc and comprising a rotor body with a convolute vane outstanding therefrom at a gradually varying radial inclination relatively to the axis of the rotor enabling it to mesh with the slots of the disc so that portions of the disc between the slots extend into spaces between the convolutions of the vane to form partitions therebetween, a metal casing for said rotor including an inlet chamber and an outlet chamber and an open ended shroud formed of a resilient material such as rubber which is located between said chambers and communicates therewith and in which the rotor is received and through which said disc projects to mesh with the rotor, the body of the rotor being of longitudinal curvature corresponding to the peripheral curvature of the disc and running closely adjacent to the periphery of the disc and the convolute vane being of gradually varying height to cause the vane to extend to a varying extent into the slots of the disc whilst the shroud is shaped in conformity with the envelope of the vane and is of axially curved non-cylindrical form such as to provide between itself and the rotor body a working space for the vane of substantially constant cross sectional area appropriate to constant volume flow, the ends of the shroud substantially coinciding with the ends of said inlet and outlet chambers to permit of a smooth and continuous flow of a fluid from the inlet chamber, through the shroud and into the outlet chamber in a direction substantially following the longitudinal contours of the rotor body and shroud.

References Cited in the file of this patent

UNITED STATES PATENTS

| Number | Name | Date |
|---|---|---|
| 265,381 | Buck | Oct. 3, 1882 |
| 983,365 | Haskell | Feb. 7, 1911 |
| 1,670,681 | Haas | May 22, 1928 |
| 1,735,477 | Stuart | Nov. 12, 1929 |
| 1,946,097 | Morris et al. | Feb. 6, 1934 |
| 2,058,230 | Hornbostel | Oct. 20, 1936 |
| 2,327,089 | Bejeuhr | Aug. 17, 1943 |
| 2,428,995 | Rogers | Oct. 14, 1947 |
| 2,500,143 | Biermann | Mar. 7, 1950 |
| 2,527,673 | Byram | Oct. 31, 1950 |
| 2,603,412 | Chilton | July 15, 1952 |

FOREIGN PATENTS

| Number | Country | Date |
|---|---|---|
| 456 | Great Britain | Feb. 4, 1876 |
| 37,417 | Norway | June 30, 1924 |
| 320,038 | Germany | May 21, 1920 |